July 12, 1927.
G. HOFMANN
METHOD OF PRESERVING EGGS
Filed June 20, 1923
1,635,843
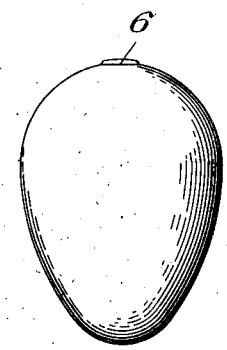
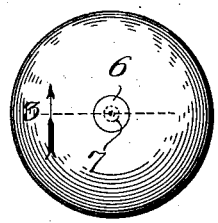
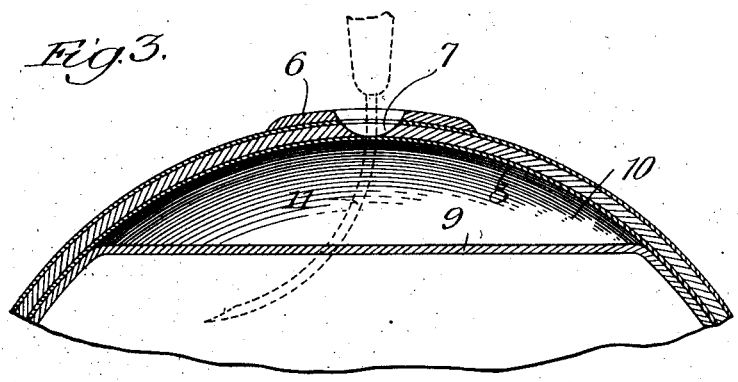
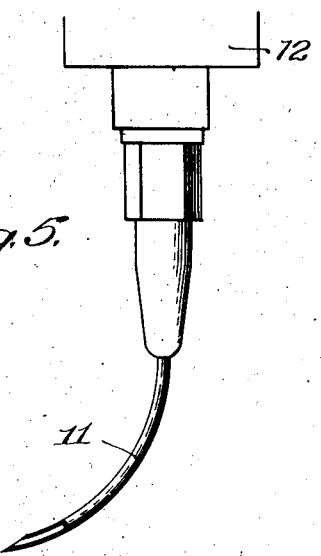
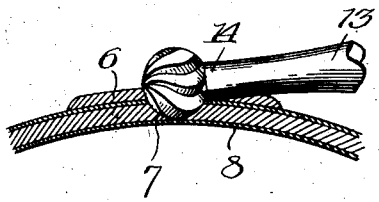
Inventor:
George Hofmann,
By Dyrenforth, Lee, Chritton & Wiles,
Attys.

Patented July 12, 1927.

1,635,843

UNITED STATES PATENT OFFICE.

GEORGE HOFMANN, OF CHICAGO, ILLINOIS.

METHOD OF PRESERVING EGGS.

Application filed June 20, 1923. Serial No. 646,545.

My invention relates to the treatment of eggs for preventing deterioration thereof; and my primary object is to provide a novel method for this purpose which may be used to great advantage from a commercial standpoint and by the use of which the eggs so treated remain pure and in undeteriorated condition for relatively great lengths of time even when subjected to relatively high temperature.

It is well known that the primary factor in the deterioration of eggs is bacteria therein which, under certain temperature conditions, increase very rapidly and soon contaminate the entire contents of the egg. The propagation of bacteria in eggs is greatly enhanced by the existence therein, at their broader ends, of spaces between the shells and the membranous envelopes which surround the albuminous portions of the eggs, these envelopes adhering to the shells throughout the area of the latter except over a small area at the broader ends of the eggs; the contents of the eggs being insufficient to fill the shells, spaces or cavities are presented between the shells, at their broader ends, and the envelopes referred to, wherein certain bacteria exist and rapidly thrive and multiply under certain temperature conditions, migrating into the contents of the membranous envelopes and sooner or later rendering the eggs unfit for food.

In this connection is is one of my objects to introduce into the interior of the eggs antiseptic material in such amounts that the natural contents of the eggs and the antiseptic material, are caused to entirely fill the shells, thereby obliterating the cavities referred to and destroying all of the bacteria which may exist in the egg when it is laid and which may thereafter enter the egg.

Referring to the accompanying drawing wherein I have illustrated the preferred manner of practicing my improved method—

Figure 1 is a view in side elevation of an egg to which a body of wax has been applied at the broader end thereof in accordance with one step in my improved method. Figure 2 is a top view of the egg of Fig. 1. Figure 3 is an enlarged broken section taken at the line 3 on Fig. 2 and viewed in the direction of the arrow, this view showing, in position for use, an injecting device preferably employed for introducing the antiseptic material into the egg. Figure 4 is a section taken at the line 3 on Fig. 2 and viewed in the direction of the arrow, illustrating one of the steps in the puncturing of the shell preparatory to the injection of the antiseptic material into the interior of the egg; and Figure 5, a view in side elevation of an injecting device which may be employed in carrying out the method, the lower portion of the needle of this device being shown in section.

In practicing my method, in the preferred manner, I first apply to the broader end of the egg a drop of wax, as, for example, of the composition hereinafter described, the wax being applied preferably in fluid form and adhering to the shell, the body of wax so applied being represented at 6. The portion of the shell lying below the wax 6 is then preferably recessed, as shown at 7 in Fig. 3, this recess preferably extending part way only through the shell and more preferably to, but not through, the relatively hard inner surface-layer 8 of the shell, this recess also extending into the body of the wax 6 as represented. The bottom of the recess 7 is then punctured and an opening is made in that portion of the membranous envelope hereinbefore referred to, and represented at 9, which does not adhere to the inner surface of the shell, and any suitable antiseptic material is introduced into the egg through the said aperture in the shell, of an amount sufficient to cause it, with the natural contents of the egg, to completely fill the space within the shell, the said opening in the latter thereafter being sealed. The puncturing of the base of the recess 7 and the portion 9 of the membranous envelope is done preferably by a needle-like tubular member through which the antiseptic material, preferably a solution, is introduced into the space within the shell, whereby the solution is injected directly into the space within the said envelope, the solution being introduced under pressure sufficient to cause it, with the natural contents of the egg, to completely fill the space within the shell and in thus filling this space cause the portion 9 of the membranous envelope to be forced flatwise into contact with the inner surface of the shell which it opposes, whereby this envelope, throughout its area, extends into contact with the inner surface of the shell thereby obliterating the cavity which exists, as represented at 10, between the shell at its broader end, and the portion 9 of the membranous envelope.

The instrument shown in Fig. 5 is admirably suited for performing the injecting operation, this tool being formed at its lower end with a hollow needle 11 preferably curved lengthwise, as shown, and constituting a part of the ordinary hypodermic syringe the lower portion of the body of which is represented at 12 and which operates, when actuated, to force the antiseptic charge into the egg, when positioned as shown in dotted lines in Fig. 3.

The tubular needle 11 is preferably curved, as shown, in order that the injected solution will enter the albuminous portion of the egg between the envelope enclosing the yolk and the membranous envelope of which the portion 9 is a part, in a lateral direction, thereby avoiding danger of breaking the envelope which surrounds the yolk, the solution entering that portion of the albuminous content which is located adjacent the membranous envelope of which the portion 9 is a part, and which is of relatively thin consistency, as compared with that portion of the albuminous content which immediately surrounds the yolk of the egg. The injected fluid thus becomes quickly mixed with all of this portion of the albuminous content of relatively thin consistency, and completely surrounds the portion of the albuminous content of greater consistency through which latter and the yoke this solution becomes disseminated, impregnating the entire contents of the shell, rendering inactive such bacteria as may exist in the shell at the time of the injection and rendering the contents of the egg immune to bacteria subsequently entering the egg.

Furthermore, by providing the needle 11 of curved shape and of a length relative to the egg, as shown, danger of the pointed end of the needle penetrating the membranous envelope interposed between the yolk and the albuminous content of the egg, is prevented.

The recess 7 is preferably formed by means of a rotary burr 13 driven in any suitable manner, as in the case of a dental burr, the form of burr shown, in fact, being one form of dental burr commonly employed in dentistry and presenting a series of cutter edges. In the use of the burr it is caused to be so positioned relative to the egg shell, as shown in Fig. 4, that the recess 7 is formed by those portions of the cutting edges which are located intermediate the ends thereof, this operation being performed after the wax 6 has been applied to the position shown in the drawings. The head of the burr 13 thus first cuts through the body 6 of wax and then cuts into the shell to form the recess 7, the burr in thus operating carrying into the recess portions of the wax whereby the entire wall surface of the recess 7 presents a relatively thin coating of the wax.

As hereinbefore stated it is preferred that the recess 7 extend only part way through the shell, and in order that this recess be so formed it is desirable that the burr 13 be of such size that its shank portion 14, adjacent the head of the burr, will contact with the outer surface of the shell adjacent the recess 7, immediately before the burr penetrates the shell, the shank in this operation passing through the body 6 of wax and bearing against the shell and thus forming a stop for the burr.

The cutting into the shell by using a burr, as explained, is of advantage as thereby cracking and splintering of the shell is avoided, the needle, when the burr does not cut entirely through the shell, as stated, penetrating an exceedingly thin shell portion which may be readily penetrated without danger of cracking the shell, whereby a comparatively smooth hole is made in the end of the egg.

It will of course be understood that the formation of a recess, as the recess 7, which does not extend entirely through the shell, is not indispensable to the carrying out of my improved method, though it is preferred, especially where a considerable time elapses between the operating on the shell by the burr and the injecting of the antiseptic solution, into the egg, the very thin portion of shell presented at the bottom of the recess preventing contamination of the egg from the exterior thereof and still it is readily puncturable by the tubular needle.

After the injecting needle has been withdrawn from the egg, following the injecting operation, the opening in the shell through which the needle was introduced is sealed, this being effected by the body of wax 6. This may be conveniently and readily done by merely touching the body of wax with a heated object to cause the wax to flow into the recess 7 and form a hermetic closure for the opening. In this connection it may be stated that in order to insure the introduction of the desired amount of antiseptic solution into the egg to cause the contents thereof to entirely fill the shell, the operator continues to charge the solution into the shell until it begins to discharge through the inlet opening. The egg content is of such character that wax for sealing will not adhere to the shell if wet with the contents of the shell. In this connection it is of considerable importance that the wax be applied to the shell before the injecting operation, and preferably before the operation of forming the recess 7, inasmuch as thereby a bond is established between the wax and the dry shell and complete sealing may be effected by merely rendering the body of wax continuous, after the withdrawal of the needle, as by melting it and forming a solid mass, as explained. Furthermore in this connection it may be stated that inasmuch as the burr carries the wax down into the recess and coats the wall surface of the latter, and the opening made by the needle is very small, the sealing operation referred to may be readily performed.

While I may employ any suitable antiseptic material for introduction into the interior of the egg to render it antiseptic, I prefer to employ the antiseptic in solution form and prefer to use a solution of sodium benzoate in the proportions preferably of one drop of standard saturated solution of benzoate of soda to five drops of distilled water, the average egg requiring about twelve drops of the liquid to fill the cavity in the egg. I prefer to use the benzoate of soda solution as it is not only very effective, but it is colorless and tasteless; and the proportions stated above, which provide for about one drop of the benzoate saturated solution, to each fluid ounce of the natural contents of the egg, are correct for effecting the desired antiseptic condition of the egg content without altering the consistency thereof.

Any suitable sealing material may be used, as, for example and by preference, a compound composed of eight parts of paraffin and two parts of beeswax, by weight, these ingredients being melted, and thoroughly mixed together, the resulting compound being preferably applied to the shell in fluid condition as hereinbefore described. If desired, the eggs after being charged with the antiseptic material, may have applied thereto any desirable moisture-proof material, as for example by dipping them in melted paraffin, which closes the pores of the shell, minimizing evaporation of the contents of the eggs and preventing the drying out of the shell and thereby preserving the shell which, unless treated, dries out producing enlargement of the pores thereof.

While it is preferred to introduce the antiseptic material into the interior of the egg through an opening formed in the shell, as by piercing the shell with an injecting needle, I do not wish to be understood as intending to limit my invention thereto as the material may be otherwise introduced into the egg without departing from the spirit of the invention. Furthermore, while it is preferred to introduce the antiseptic material into the egg at its broader end, and directly into the interior of the membranous envelope, as explained, I do not intend to limit my invention thereto as the material may be introduced into the egg at other points. The above-referred-to variations as well as many other variations may be made in the practicing of my improved method, it being my intention to claim my inventon as fully and completely as the prior state of the art will permit.

What I claim as new, and desire to secure by Letters Patent, is:

1. The method of preserving eggs which consists in introducing liquid antiseptic material into the interior of the egg to an amount sufficient to cause the contents of the egg to completely fill the space within the shell.

2. The method of preserving eggs which consists in forming an opening in the shell and introducing antiseptic material into the interior of the egg through said opening.

3. The method of preserving eggs which consists in forming an opening in the shell and introducing liquid antiseptic material into the interior of the egg through said opening.

4. The method of preserving eggs which consists in forming an opening in the shell and introducing antiseptic material into the interior of the egg through said opening to an amount sufficient to cause the contents of the egg to completely fill the space within the shell.

5. The method of preserving eggs which consists in directing antiseptic material into the albuminous mass of the egg which surrounds the yolk and is enveloped by the membranous envelope extending at the inner surface of the shell.

6. The method of preserving eggs which consists in introducing an antiseptic solution into the albuminous mass of the egg surrounding the yolk and which is enveloped by the membranous envelope extending at the inner surface of the shell.

7. The method of preserving eggs which consists in introducing liquid antiseptic material into the albuminous mass of the egg surrounding the yolk and which is enveloped by the membranous envelope extending at the inner surface of the shell, to an amount sufficient to cause the contents of the egg to completely fill the space within the shell.

8. The method of preserving eggs which consists in directing antiseptic material into the albuminous mass of the egg surrounding the yolk and which is enveloped by the membranous envelope extending at the inner surface of the shell, to an amount sufficient to cause the contents of the egg to completely fill the space within the shell.

9. The method of preserving eggs which consists in introducing antiseptic material into the interior of the shell at the broader end only thereof.

10. The method of preserving eggs which consists in introducing liquid antiseptic material into the interior of the shell at the broader end only thereof.

11. The method of preserving eggs which consists in forming an opening in the broader end of the shell and introducing antiseptic material into the interior of the egg through said opening.

12. The method of preserving eggs which consists in introducing liquid antiseptic material into the interior of the shell at the broader end thereof, to an amount sufficient to cause the contents of the egg to completely fill the space within its shell.

13. The method of preserving eggs which consists in introducing antiseptic material into the interior of the shell at the broader end only thereof, to an amount sufficient to cause the contents of the egg to completely fill the space within its shell.

14. The method of preserving eggs which consists in introducing liquid antiseptic material through the broader end of the shell and into the albuminous mass of the egg surrounding the yolk and which is enveloped by the membranous lining extending at the inner surface of the shell.

15. The method of preserving eggs which consists in introducing antiseptic material through the broader end only of the shell and into the albuminous mass of the egg surrounding the yolk and which is enveloped by the membranous lining extending at the inner surface of the shell.

16. The method of preserving eggs which consists in forming an opening in the shell and the membranous film enveloping the albuminous mass of the egg and extending at the inner surface of the shell, and causing antiseptic material to enter the interior of the enveloping membranous film and press this film throughout its extent against the inner surface of the shell and cause the contents of the egg to completely fill the shell.

17. The method of preserving eggs which consists in forming an opening in the shell and the membranous film enveloping the albuminous mass of the egg and extending at the inner surface of the shell, at the broader end of the shell, and causing antiseptic material to enter the interior of the enveloping membranous film and press this film throughout its extent against the inner surface of the shell and cause the contents of the egg to completely fill the shell.

18. The method of preserving eggs which consists in forming an opening in the shell and the membranous film enveloping the albuminous mass of the egg and extending at the inner surface of the shell, and introducing antiseptic material through the openings in the shell and film and directly into said albuminous mass.

19. The method of preserving eggs which consists in forming an opening in the shell and the membranous film enveloping the albuminous mass of the egg and extending at the inner surface of the shell, and introducing antiseptic material through the openings in the shell and film and directly into the portion of said albuminous mass extending adjacent the shell and of relatively thin consistency.

20. The method of preserving eggs which consists in forming an opening in the shell and introducing antiseptic material into the interior of the egg through said opening and thereafter sealing the opening in the shell.

21. The method of preserving eggs which consists in applying sealing material to the shell to adhere thereto, boring the shell at the portion thereof covered by said sealing material, introducing antiseptic material into the interior of the shell at the bored portion thereof and thereafter sealing the opening by sealing material.

22. The method of preserving eggs which consists in applying sealing material to the shell to adhere thereto, forming an opening in the shell at the portion thereof covered by the sealing material, introducing antiseptic material into the interior of the shell at said opening and thereafter causing the sealing material to close said opening.

GEORGE HOFMANN.